(12) United States Patent
Watkins

(10) Patent No.: US 8,348,589 B2
(45) Date of Patent: Jan. 8, 2013

(54) UNIVERSAL FOLDING BOOM TRAILER

(75) Inventor: Doyle E. Watkins, Britton, MI (US)

(73) Assignee: Wastow Enterprises LLC, Britton, MI (US)

( * ) Notice: Subject to any disclaimer, the term of this patent is extended or adjusted under 35 U.S.C. 154(b) by 0 days.

(21) Appl. No.: 13/283,932

(22) Filed: Oct. 28, 2011

(65) Prior Publication Data

US 2012/0045307 A1 Feb. 23, 2012

Related U.S. Application Data

(63) Continuation of application No. 12/303,561, filed as application No. PCT/US2007/070406 on Jun. 5, 2007, now Pat. No. 8,047,758.

(60) Provisional application No. 60/811,250, filed on Jun. 6, 2006.

(51) Int. Cl.
*B60P 3/12* (2006.01)

(52) U.S. Cl. ........................ 414/563; 280/476.1; 280/402

(58) Field of Classification Search ................... 414/563, 414/467, 686; 280/402, 475, 423.1, 476.1, 280/656, 767
See application file for complete search history.

(56) References Cited

U.S. PATENT DOCUMENTS

| | | | |
|---|---|---|---|
| 3,580,627 A | 5/1971 | Underwood et al. | |
| 3,613,919 A | 10/1971 | Ceepo et al. | |
| 3,737,177 A | 6/1973 | Gal | |
| 3,993,342 A | 11/1976 | Jones et al. | |
| 4,202,562 A | 5/1980 | Sorenson | |
| 4,398,743 A | 8/1983 | Belsky et al. | |
| 4,469,346 A | 9/1984 | Low | |
| 4,493,491 A | 1/1985 | Karlik | |
| 4,555,214 A | 11/1985 | Morton | |
| 4,708,358 A | 11/1987 | Gehman et al. | |
| 4,737,066 A | 4/1988 | Allison, Jr. | |
| 4,842,472 A * | 6/1989 | Plant | 414/563 |
| 4,867,468 A | 9/1989 | Paul et al. | |
| 4,949,985 A | 8/1990 | Lichter | |
| 4,974,125 A | 11/1990 | McGehee | |
| 5,152,656 A | 10/1992 | Potter | |
| 5,163,803 A * | 11/1992 | Marola | 414/563 |
| 5,326,123 A | 7/1994 | Guest et al. | |
| 5,326,215 A | 7/1994 | Eberhardt | |
| 5,391,044 A | 2/1995 | Young | |
| 5,401,050 A | 3/1995 | Baker | |
| 5,465,813 A | 11/1995 | Lichter | |

(Continued)

FOREIGN PATENT DOCUMENTS

GB 2040847 A 9/1980

*Primary Examiner* — Saul Rodriguez
*Assistant Examiner* — Glenn Myers
(74) *Attorney, Agent, or Firm* — Fraser Clemens Martin & Miller LLC; Jacob M. Ward

(57) ABSTRACT

A Universal Folding Boom Trailer for transporting multiple vehicles provides a safe and legal manner for towing. The trailer includes a winch for loading and unloading the towed vehicles and can act alone as a crane if desired. Further, this trailer arrangement backs up like a conventional trailer. The Universal Folding Boom Trailer provides a means for a driver to haul multiple vehicles in both directions. The driver is able to attach the trailer to a personal fifth wheel and tow any type of unit: a fifth wheel trailer, a ball hitch trailer, or a gooseneck, among others—instead of dead-heading.

9 Claims, 9 Drawing Sheets

U.S. PATENT DOCUMENTS

| | | | |
|---|---|---|---|
| 5,566,964 A | 10/1996 | Leonard | |
| 5,626,356 A | 5/1997 | Harwood | |
| 5,703,411 A | 12/1997 | Bella et al. | |
| 5,722,677 A | 3/1998 | Lichter et al. | |
| 5,810,544 A | 9/1998 | Wellman | |
| 5,853,283 A | 12/1998 | Grant | |
| 5,873,593 A | 2/1999 | Gesuale | |
| 5,904,364 A | 5/1999 | Wylezinski et al. | |
| 5,947,503 A | 9/1999 | Tompkins | |
| 6,109,642 A | 8/2000 | Schuettenberg | |
| 6,120,051 A | 9/2000 | Lichter et al. | |
| 6,139,250 A | 10/2000 | Nolasco | |
| 6,209,297 B1 | 4/2001 | Yeomans et al. | |
| 6,491,490 B1 | 12/2002 | Trobee | |
| 6,874,803 B2 | 4/2005 | McDougall et al. | |
| 6,893,039 B2 | 5/2005 | Scharmuller | |
| 7,017,934 B2 | 3/2006 | Harris | |
| 7,100,933 B2 | 9/2006 | Zackovich et al. | |
| 7,153,082 B2 | 12/2006 | Nolasco | |
| 7,188,848 B2 | 3/2007 | Chapman | |
| 7,422,225 B2 | 9/2008 | Troha et al. | |
| 7,547,179 B1 | 6/2009 | Edmonson | |
| 7,980,582 B2 * | 7/2011 | Schuettenberg | 280/476.1 |
| 8,002,303 B2 * | 8/2011 | Lundin | 280/476.1 |
| 8,047,758 B2 * | 11/2011 | Watkins | 414/563 |
| 2002/0053781 A1 | 5/2002 | Troha et al. | |
| 2004/0036255 A1 | 2/2004 | Orlando | |
| 2004/0052602 A1 | 3/2004 | Troha et al. | |
| 2006/0226612 A1 | 10/2006 | Smith et al. | |
| 2008/0036176 A1 * | 2/2008 | Schuettenberg | 280/476.1 |
| 2008/0157504 A1 | 7/2008 | Schuettenberg | |
| 2009/0136332 A1 * | 5/2009 | Boates | 414/563 |
| 2010/0320726 A1 | 12/2010 | Watkins | |

* cited by examiner

UNIVERSAL FOLDING BOOM TRAILER

CROSS REFERENCE TO RELATED APPLICATION

This application is a continuation of U.S. patent application Ser. No. 12/303,561 filed on Dec. 5, 2008, now issued as U.S. Pat. No. 8,047,758, which in turn is a National Stage of International Application No. PCT/US07/70406 filed Jun. 5, 2007, which in turn claims the benefit of U.S. Provisional Application No. 60/811,250 filed on Jun. 6, 2006. The entire disclosures of the above applications are hereby incorporated herein by reference.

BACKGROUND OF THE INVENTION

The present invention relates generally to a method and apparatus for transporting and delivering multiple trucks, and in particular, to a universal folding boom trailer for loading, transporting and delivering trucks in compliance with the Department of Transportation Regulations.

FIG. 1 illustrates a prior art method of towing semi tractor trucks 10. This current method of towing provides delivery of two semi tractor trucks at a time, one semi tractor truck 12 typically is facing forward and towing a boom trailer 14. The second semi tractor truck 16 is connected to the boom trailer 14 by its fifth wheel connection 18 and is towed facing backwards with only the steering tires 20 on the ground 22. The steering tires 20 are held in a straight position on the towed semi tractor truck 16 by securing the steering wheel with the driver's seat belt. The driver's personal pickup truck 24 is transported on top of the boom trailer 14 between the semi tractor trucks 12, 16 (the loading ramps are not shown).

In this arrangement, the majority of the weight of the pick up truck 24 is behind the fifth wheel 26. The majority of the weight of the boom trailer 14 is also behind the semi tractor truck fifth wheel 26. Therefore, the entire weight of the pickup truck 24 and the boom trailer 14 is supported by the steering tires 20. The steering tires 20 also support the entire semi tractor truck 16 while being towed backwards.

The Department of Transportation regulations requires that the steering tires, such as those shown at 20, of a semi tractor truck should not exceed 12,000 lbs. This current method of towing exceeds this limit by thousands of pounds. The entire towing method illustrated in FIG. 1 is improperly loaded because the majority of the weight is to the rear of the truck and trailer combination. This overweight towing arrangement may cause the steering tires to blow out in transit. In turn, a blowout can cause the towed truck 16 to change lanes and collide with a passing vehicle. While the castering effect of a semi tractor truck going forward assists in holding the steering tires 20 straight, when the truck is pulled backwards as described herein, the castering effect will actually cause the steering tires 20 to turn either left or right. The seat belt is inadequate to keep the steering wheel straight in case of a tire blowout.

SUMMARY OF THE INVENTION

The present invention overcomes all the shortcoming of previous methods and apparatuses by providing a new Universal Folding Boom Trailer for transported multiple vehicles in a safe and legal manner. The configuration of the trailer eliminates the need for a crane or wrecker when loading and unloading the towed vehicles, but includes a winch that can act alone as a crane or hoist if desired. Further, this trailer arrangement backs up like a conventional trailer. The Universal Folding Boom Trailer can be transported in either direction, from front or back. The driver is able to attach the trailer to a personal pick-up truck and tow any type of unit: a fifth wheel trailer, a ball hitch trailer, or a gooseneck, among others—instead of dead-heading. A folding ladder is attached to allow the driver easy access to the pick-up truck when loaded on top of the Universal Folding Boom Trailer when transporting multiple types of vehicles.

FIG. 2 illustrates the Universal Folding Boom Trailer 30 of the present invention legally and safely transporting two trucks 32, 34 and carrying a personal pickup truck 36 between them. The Universal Folding Boom Trailer 30 is not limited to the towing of only semi tractor trucks because a fifth wheel connection is not necessary on the towed truck 34. Since the towed truck 34 is towed facing forward, the Universal Folding Boom Trailer 30 can tow either a box truck, flatbed truck, straight or semi tractor trailer truck (as shown). With this new apparatus and method, the majority of the weight of the boom 38 and the pickup truck 36 is supported by dual wheeled axles 40 of the truck 34 now being towed forward.

A further advantage of supporting the weight on the rear axles is that the wheels 40 are non-steering and have a much higher weight bearing capacity.

A still further advantage of the Universal Folding Boom Trailer 30 is that the steering tires 20 of the towed truck 34 are elevated above the road and free of any weight bearing loads. This elevated location eliminates the need to immobilize the steering wheel with the driver seat belt. Further, since the truck 34 is being towed forward with the weight on the rear tires, there are more tires on the ground for increased braking effect and consequently, the towed truck 34 is less apt to have a blowout, eliminating the opportunity for changing lanes and colliding with a passing vehicle.

In a second preferred embodiment, the Universal Folding Boom Trailer 30 may be converted to a crane 142, using a winch 44 for loading and unloading towing vehicles in a piggy back configuration.

BRIEF DESCRIPTION OF THE DRAWINGS

The above, as well as other advantages of the present invention will become readily apparent to those skilled in the art from the following detailed description of a preferred embodiment when considered in the light of the accompanying drawings in which.

DETAILED DESCRIPTION OF THE PREFERRED EMBODIMENT

Figure 1:
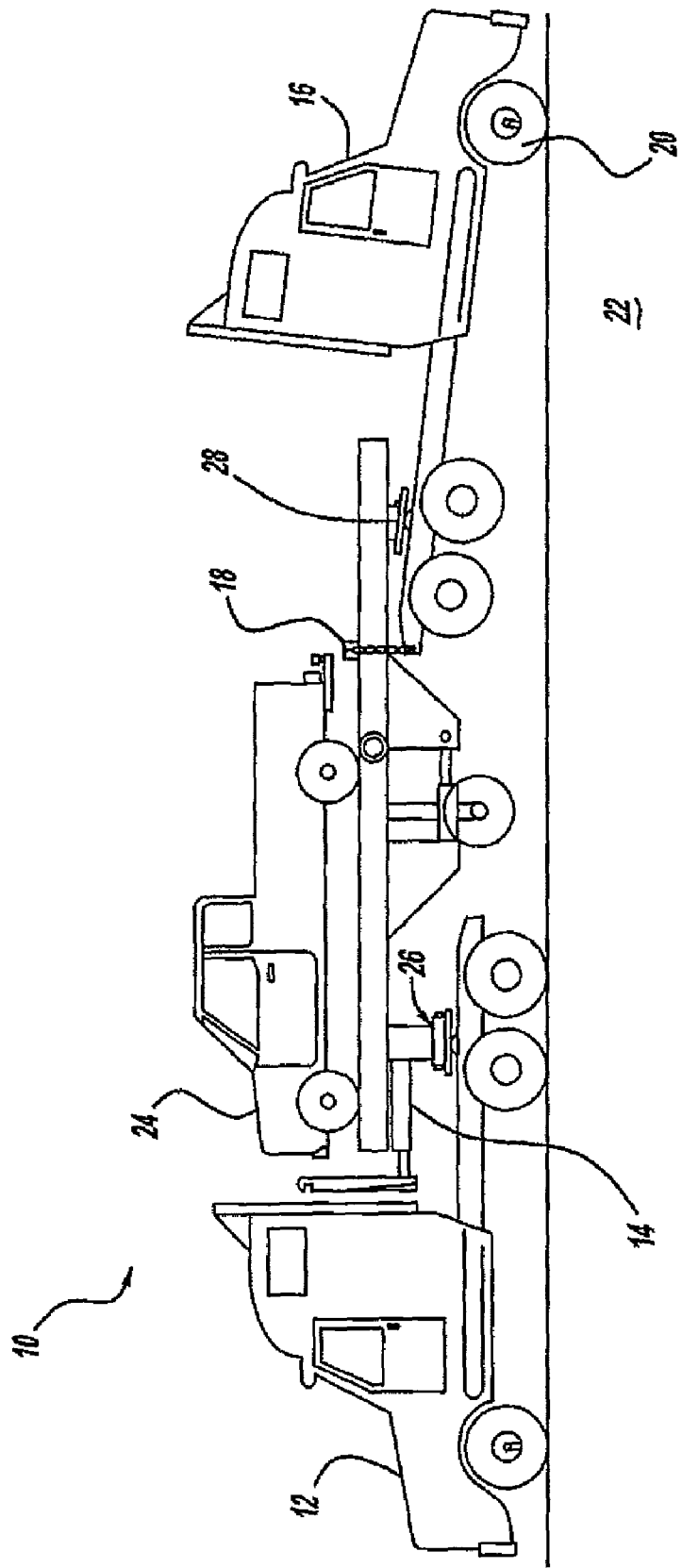
FIG. 1 illustrates the typical prior art towing method.

With reference to FIGS. 2-8, there is shown a first preferred embodiment of the apparatus and method of the present invention.

A Universal Folding Boom Trailer (30) is there shown comprising:
- a boom trailer (30) including a rotatable boom (38) for supporting at least two vehicles (34, 36) upon the boom trailer (30) for transporting;
- wherein the at least two vehicles (34, 36) are towed in a forward direction;
- wherein the boom (38) is rotatable from a folded position (100) for trailering to an unfolded position (200) for transporting the at least two vehicles (34, 36);
- wherein the boom (38) is rotatable by a winch (44);
- wherein the boom (38) in the unfolded position (200) further comprises a position lock (82) for securing the boom (38) in the unfolded position (200) and forming a solitary trailer whereby the Universal Folding Boom Trailer (30) backs up like a conventional trailer; and
- the Universal Folding Boom Trailer (30) further comprising a first means for securing (60) the Universal Folding Boom Trailer (30) to a towing vehicle (32), preferably a multi-position king pin; and a second means for securing (58) the Universal Folding Boom Trailer (30) to a towing vehicle (36), preferably a fifth wheel.

Additionally, the Universal Folding Boom Trailer (30) may be used as a crane. In this position illustrated in FIG. 9, the boom (38) is rotatable to a crane position (300) and is used in conjunction with the winch (44) for lowering the vehicles (34, 36, 38) from a forward position. Alternatively, the crane position (300) provides a means for decking at least one vehicle (34) upon another vehicle (34) for towing in a forward facing position.

The invention also comprises a method for towing at least two vehicles 34, 36, wherein all of the vehicles 34, 36 are towed while facing forward comprising the steps of:
- providing a Universal Folding Boom Trailer (30) having a rotatable boom (38);
- rotating the boom (38) to an unfolded position (200);
- locking the boom (38) in the unfolded position;
- securing the boom (38) to a transporting vehicle (32);
- loading a first vehicle (36) for towing atop the trailer (30) in a forward facing position; and
- loading a second vehicle (34) for towing atop the boom (38) in a forward facing position;
- wherein when the boom (38) is in the locked position, the Universal Folding Boom Trailer (30) forms a solitary trailer and further comprises the step of:
- backing up the Universal Folding Boom Trailer (30) like a conventional trailer.
- wherein the boom (38) is rotated by a winch (44).

The method further comprises the steps of:
- after loading the first (36) and second (34) vehicles;
- loading additional vehicles (34) onto the second vehicle (34) in a forward towing position until the maximum legal towing length is reached.

To unload the towed vehicles (34, 36), the method further comprises the step of:
- driving the towed vehicle (34) and decked second vehicle (34) away from the Universal Boom Trailer (30);
- unloading the first vehicle (36) from said Universal Boom Trailer (30);
- using the Universal Boom Trailer (30) having a rotatable boom (38);
- rotating the boom (38) into the crane position (300);
- undecking the second and additional vehicles (34) by hoisting the vehicles (34) about the boom (38) via the winch (44).

The Universal Boom Trailer (30) may be trailored from either end and in any position. Specifically, the Universal Boom Trailer (30) may be trailored when the boom (38) is in the folded position (100) or in the unfolded position (200) and the towed vehicles (34) (36) are loaded or unloaded.

Figure 2:
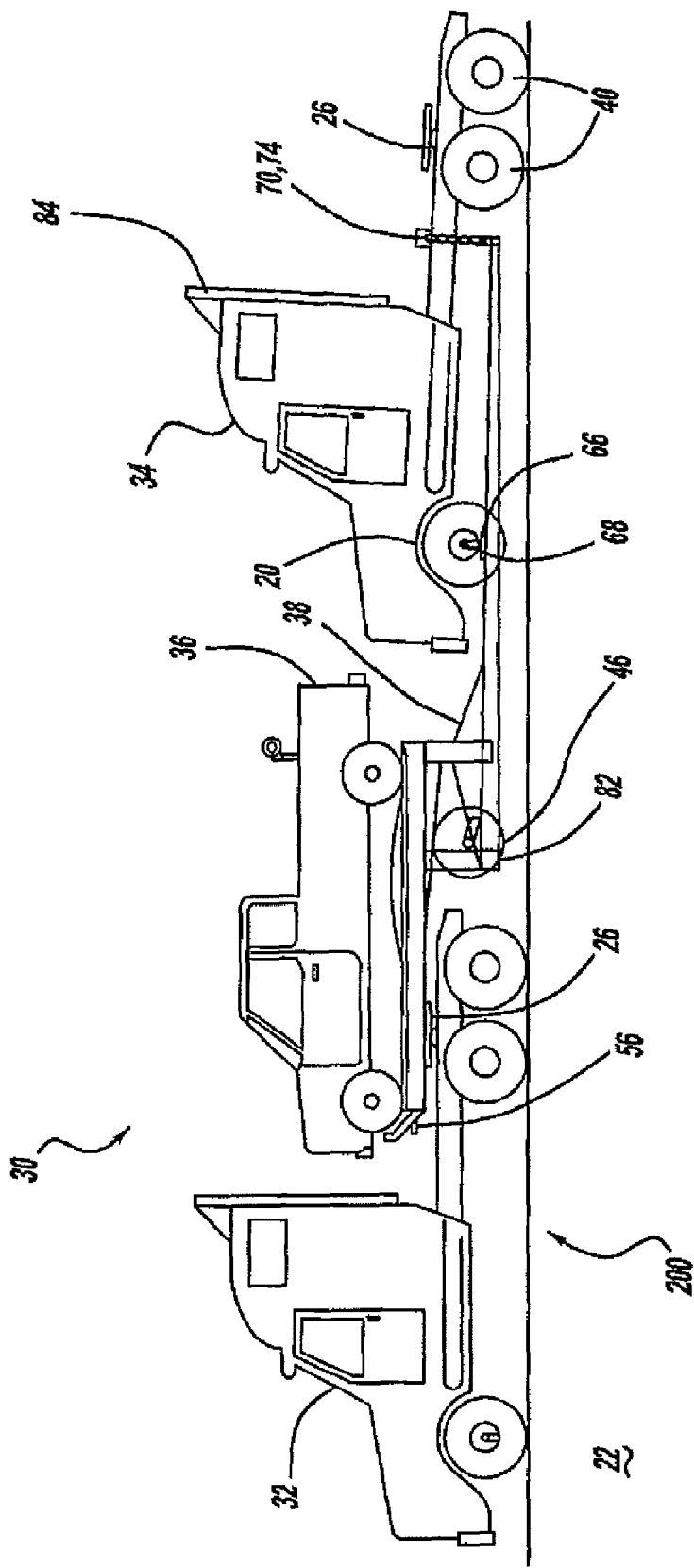
FIG. 2 illustrates a preferred method and apparatus according to the present invention.
Figure 3:
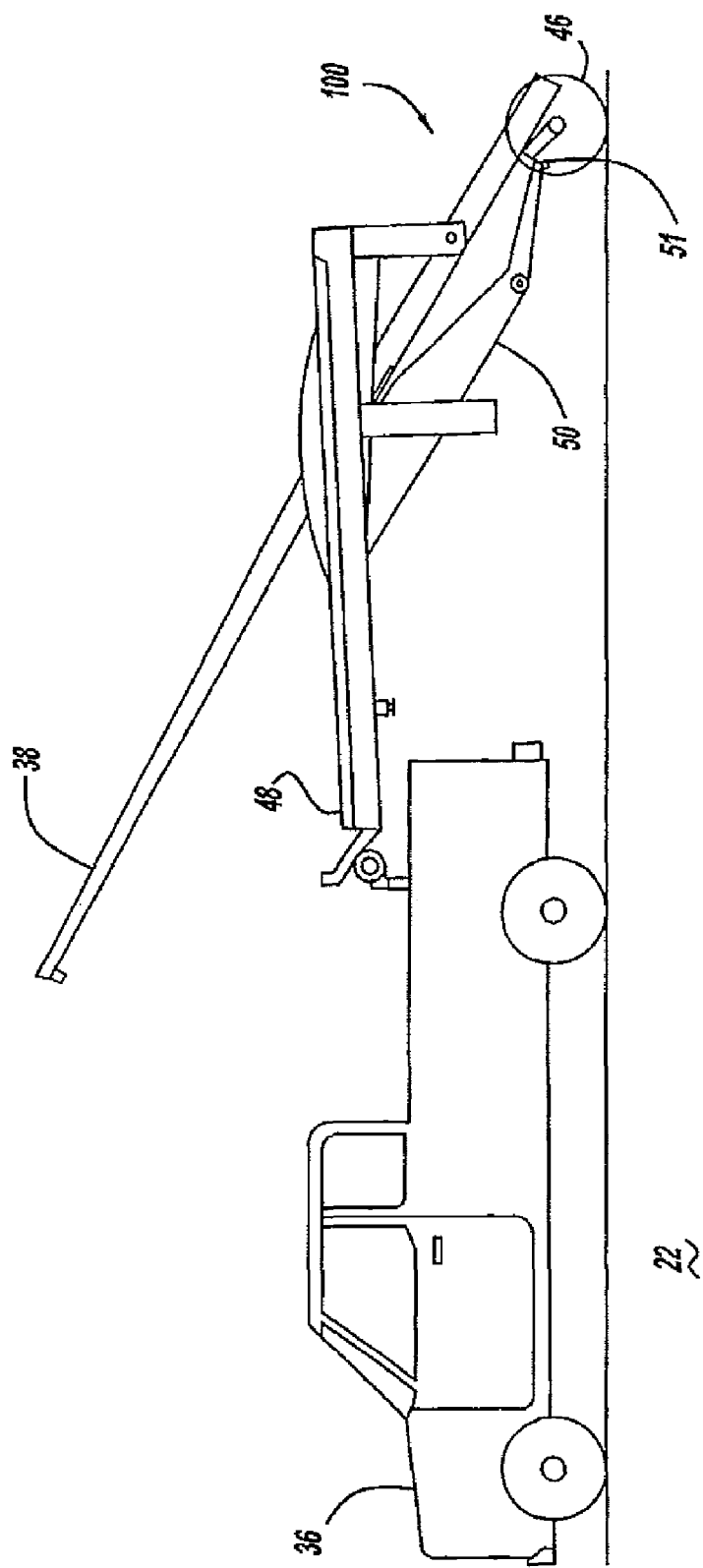
FIG. 3 illustrates a side view of the Universal Folding Boom of the present invention in a folded position.
Figure 4:
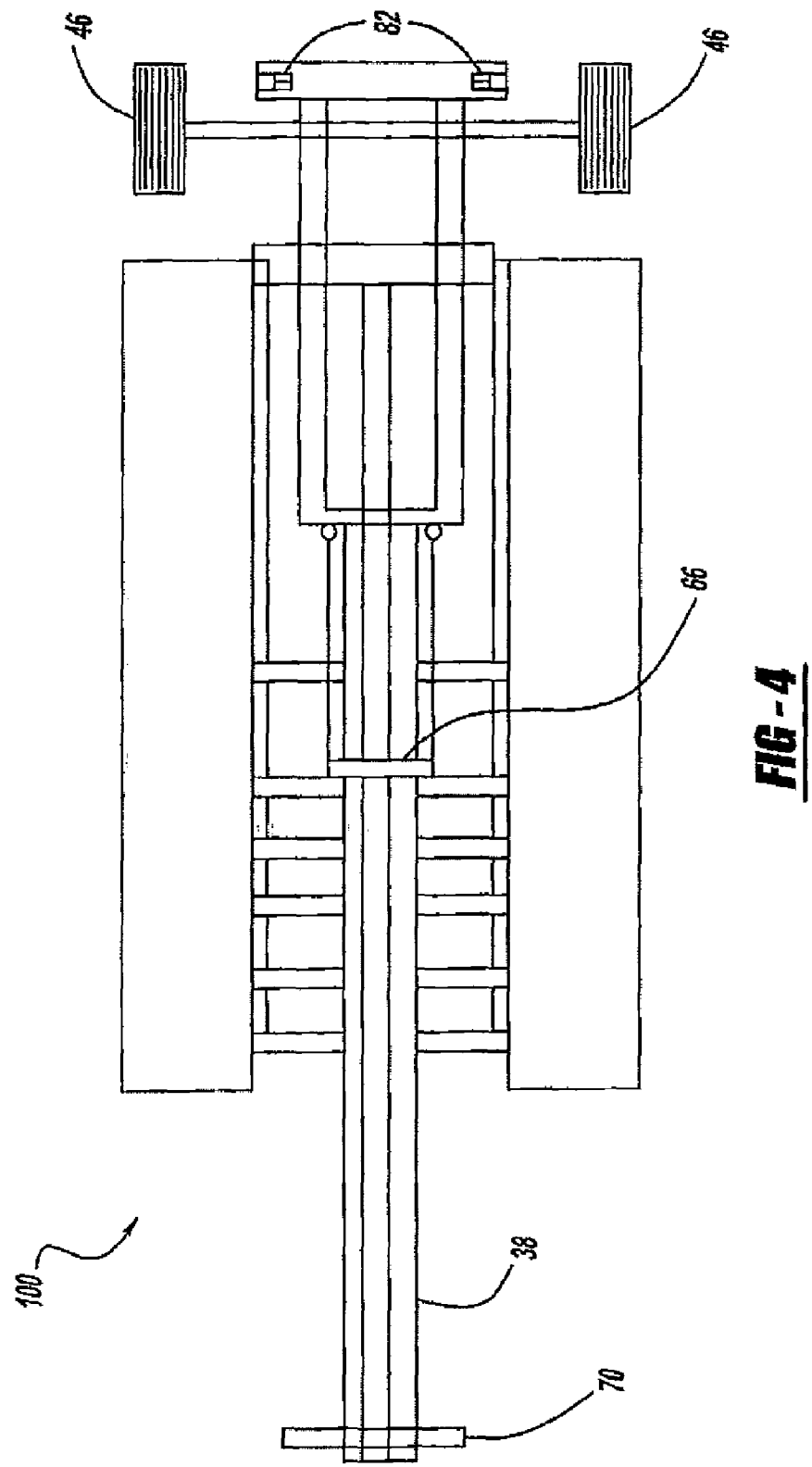
FIG. 4 is a top view of the Universal Folding Boom as shown in FIG. 3.
Figure 5:
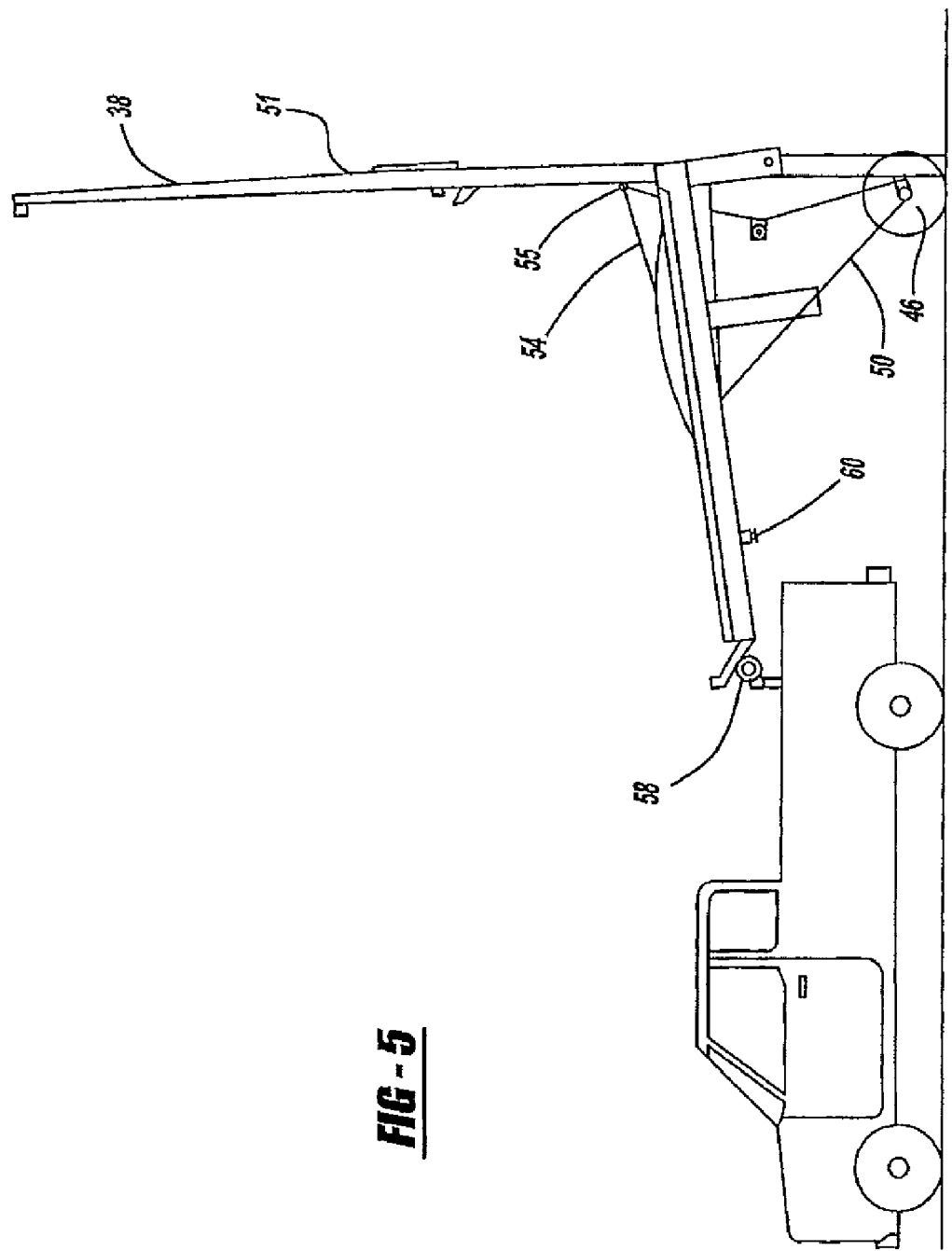
FIG. 5 illustrates a side view of the Universal Folding Boom with the boom in a vertical position.
Figure 6:
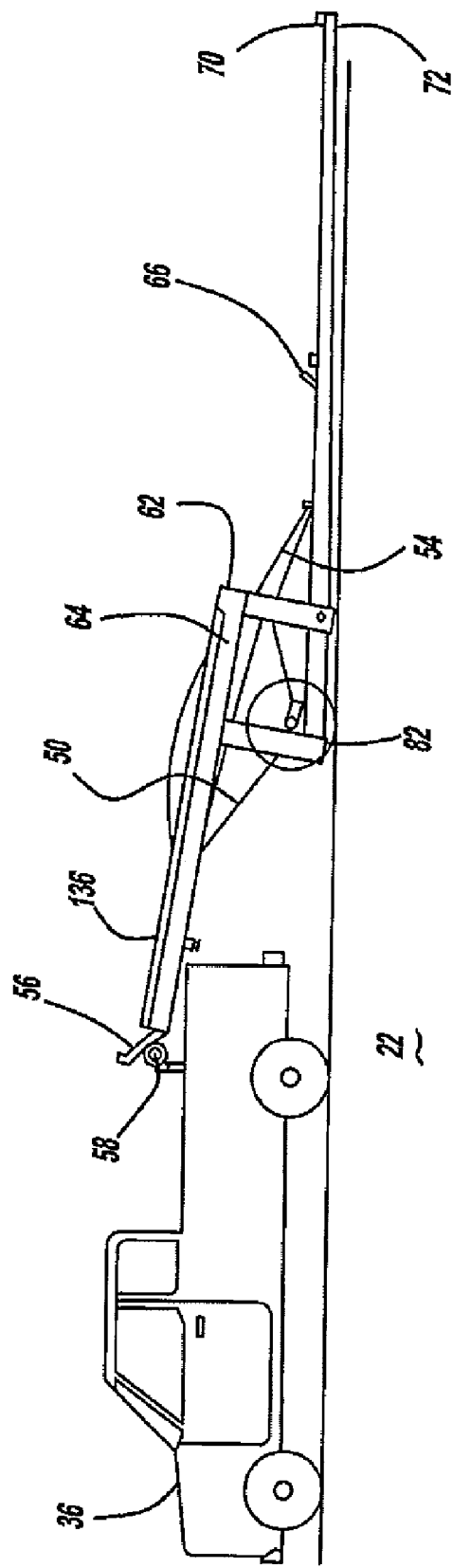
FIG. 6 illustrates a side view of the Universal Folding Boom with the boom in an extended position.
Figure 7:
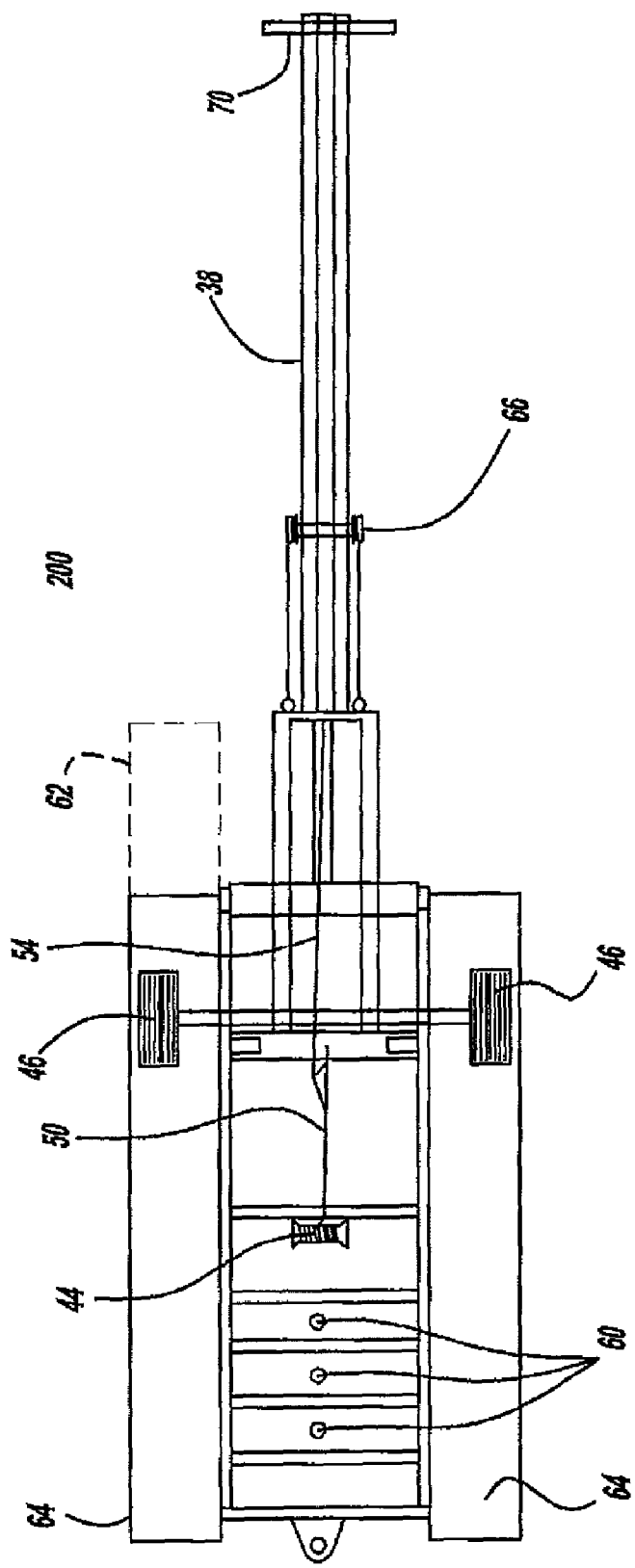
FIG. 7 illustrates a top view of the Universal Folding Boom as shown in FIG. 6.
Figure 8:
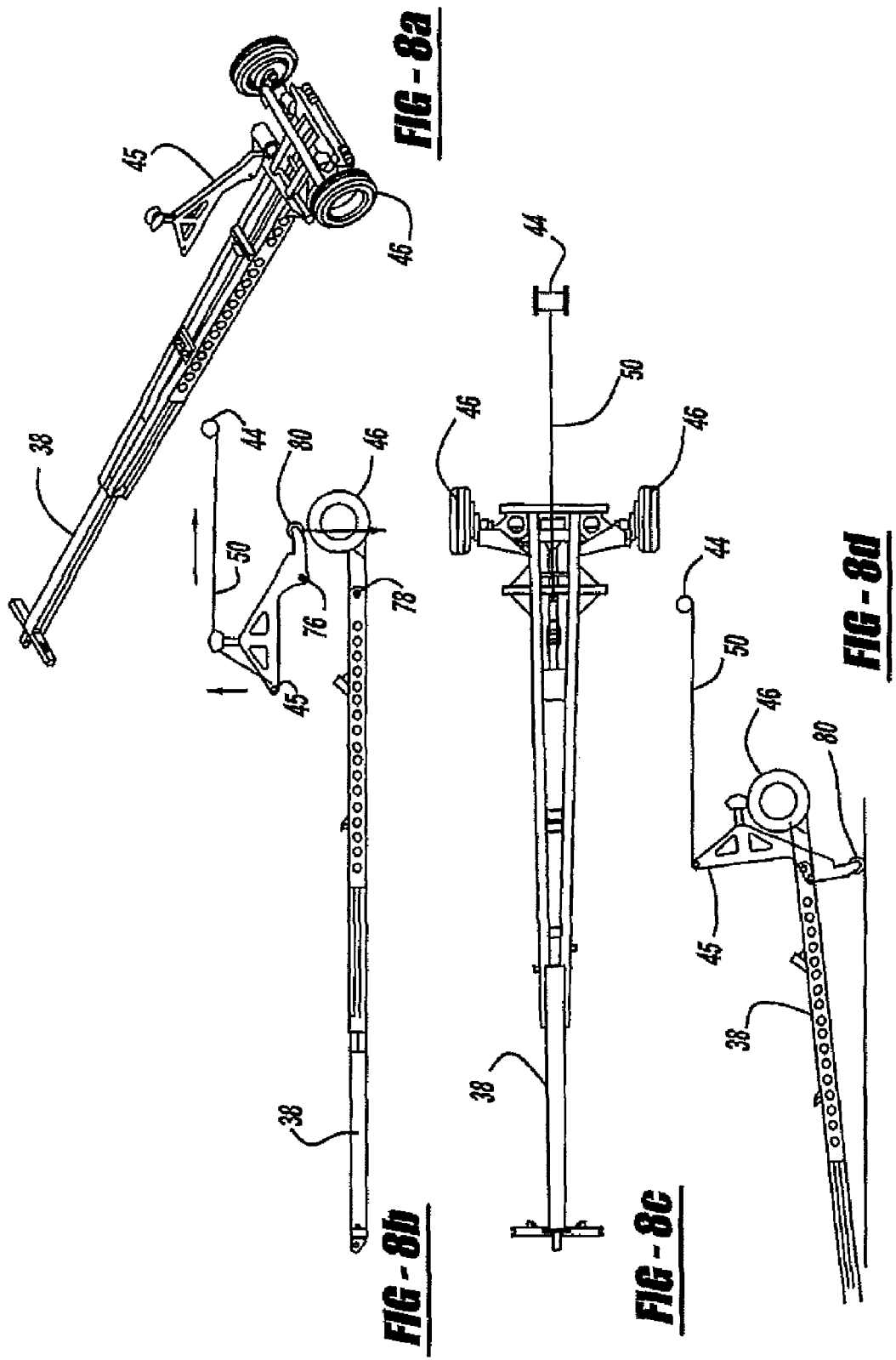
FIG. 8 a-d illustrates a bell crank of the Universal Folding Boom according to the present invention.

In the preferred method of operation, the Universal Folding Boom Trailer 30 is towed by a personal pickup truck 36 in the folded position 100, illustrated in FIGS. 3 and 4, to its pickup destination. The boom 38 is unfolded by operating a winch 44 (FIG. 7). The winch 44 pulls the transport tires 46 towards the front 48 of the Universal Folding Boom Trailer 30 with the wire cable 50 attached (FIG. 3) at 51 along the boom 38 until the boom 38 is straight up (FIG. 5). At this point, the winch 44 is reversed and the boom 38 continues to rotate in the same direction while prevented from falling by wire cable 54 (FIG. 5) located at attachment point 55 until the boom 38 lays flat on the ground 22 (see side and top views FIGS. 6 and 7, respectively). The boom trailer hitch 56 is then disconnected from the fifth wheel 58 (FIG. 6). The winch 44 is reversed again, lifting the boom trailer hitch 56 up and away from the fifth wheel 58 on the back of the pickup truck 36 as a result of the boom 38 being heavier than the front 136. The pickup truck 36 can then be driven forward and out from underneath the boom trailer 30. The semi tractor truck 32 is then backed underneath the front of the Universal Folding Boom Trailer 30 and the multi-position kingpin 60 is locked into the fifth wheel 26 (FIGS. 2 and 6). The multi-position kingpin 60 is provided with multiple coupling positions to accommodate the various hauling conditions.

The pickup truck 36 is loaded onto the boom trailer 30 by pickup truck loading ramps 62 that easily slide out from the trailer 30 when needed, as is well known in the art. The loading ramps 62 are extended from underneath the pickup truck support rails 64 (FIGS. 2 and 7). The pickup truck 36 is secured by chains and binders (not shown) as is well known in the art. The pickup truck loading ramps 62 are then slid back into their original position underneath the pickup truck support rails 64.

The second vehicle, such as the semi tractor truck 34, is then driven over and straddles the boom 38 that is lying on the ground 22 (FIGS. 2, 6 and 7). Alternatively, the second vehicle may be any type of vehicle, including a box truck, flatbed, straight truck, etc. The semi tractor truck 34 is driven forward to a front axle connector 66. The vehicle axle 68 is secured to the boom 38 by the connector 66. A frame connector 70 is connected to the frame of the semi tractor truck 34 at attachment point 72 and secured by chains 74. The attachment point 72 is adjustable and slides forward and aft for hauling various lengths of trucks.

With reference to FIGS. 8a-d, after the semi tractor truck 34 is secured, the winch 44 becomes functional by removing a locking pin 76 from its attachment point 78 of lifting arm 45 of the winch assembly along the boom 38. This allows the winch 44 to rotate when the cable 50 is retracted. This rotation applies a ground roller 80 to the ground surface 22, raising the front end of the semi tractor truck 34 and the back of the pickup truck 36 simultaneously by lifting the middle section of the Universal Folding Boom Trailer 30 upward. When the boom 38 becomes level, the pickup truck 36 becomes level and the steering tires 20 of the semi tractor truck 34 raise off the ground 22 approximately 9 inches and are, therefore, no longer in use. The boom trailer position lock 82 is inserted on both sides of the trailer 38 making the entire structure rigid, as if a one piece unit. The winch 44 is rotated back to the original position, raising the heavy duty dolly wheels 80 off the ground 22. The trucks 32, 34, 36 are now ready for transport. With this rigid configuration, the Universal Folding Boom Trailer 30 is capable of backing up like a conventional trailer.

In a preferred embodiment, the Universal Folding Boom Trailer 30 is made from aluminum, steel, fiberglass or any combination of materials capable of performing the preferred method of operation. When using steel, the main frame of the Universal Folding Boom Trailer 30 is preferably constructed of 2×8×3/16 rectangular steel tubing and the folding portion of the boom 38 is made with 8 inch "I" beams. The ramps 62 are preferably made of 3 inch channel overlaid with expanded metal or subway grating. When using steel or other weldable materials, the Universal Folding Boom Trailer 30 is of all welded construction. While the folding mechanism 44 has been described using mechanical means with an electric winch, other means such as hydraulics or pneumatics may be used.

The safety issues of the current prior art method illustrated in FIG. 1 are corrected by the use of the Universal Folding Boom Trailer 30 of the present invention. The Universal Folding Boom Trailer 30 is approximately 50% lighter than the prior art trailer making it easier to tow and stop. This adds up to more fuel savings and less wear and tear on the personal pick up truck. Since there is no hydraulics involved in the operation of the Universal Folding Boom Trailer 30, the opportunity of hydraulic fluid leaks is eliminated.

Further, the air deflection panels 28 (FIG. 1) on the towed truck 16 act like a parachute, creating drag and may even be torn off by the wind if not secured before towing begins. With the Universal Folding Boom Trailer 30, the truck 34 is towed forward and the air travels around the wind deflection panels 84 in the intended direction, eliminating any need to secure the panels 84; decreasing drag while increasing fuel efficiency.

Still further advantages of the Universal Folding Boom Trailer 30 over the prior art is the need for a light bar to be added to the front of the truck 16 being towed backwards in FIG. 1 to provide operating brake lights, turn signals, hazard lights and marker lights. Because the truck 34 in FIG. 2 is towed facing forward when using the Universal Folding Boom Trailer 30 of the present invention, the existing lights on the back of the towed truck are used, eliminating the need for a light bar.

The Universal Folding Boom Trailer 30 further provides a forward center of gravity of the forward facing towed truck creating a more stable towing environment by limiting the chance of jack knifing during hard braking or other emergency situations.

In a second preferred embodiment, the Universal Folding Boom Trailer 30 may be used as a crane to hoist vehicles, such as transport trucks, primarily for decking or cab and chassis transport. Alternatively, the Universal Folding Boom Trailer 30 may be used as a crane to hoist vehicles, such as transport trucks, for deck removal from a vehicle 34 after unhitching the towed vehicles (34) from the Universal Folding Boom Trailer 30. Additionally, the crane may be used for any hoisting needs.

Figure 9:
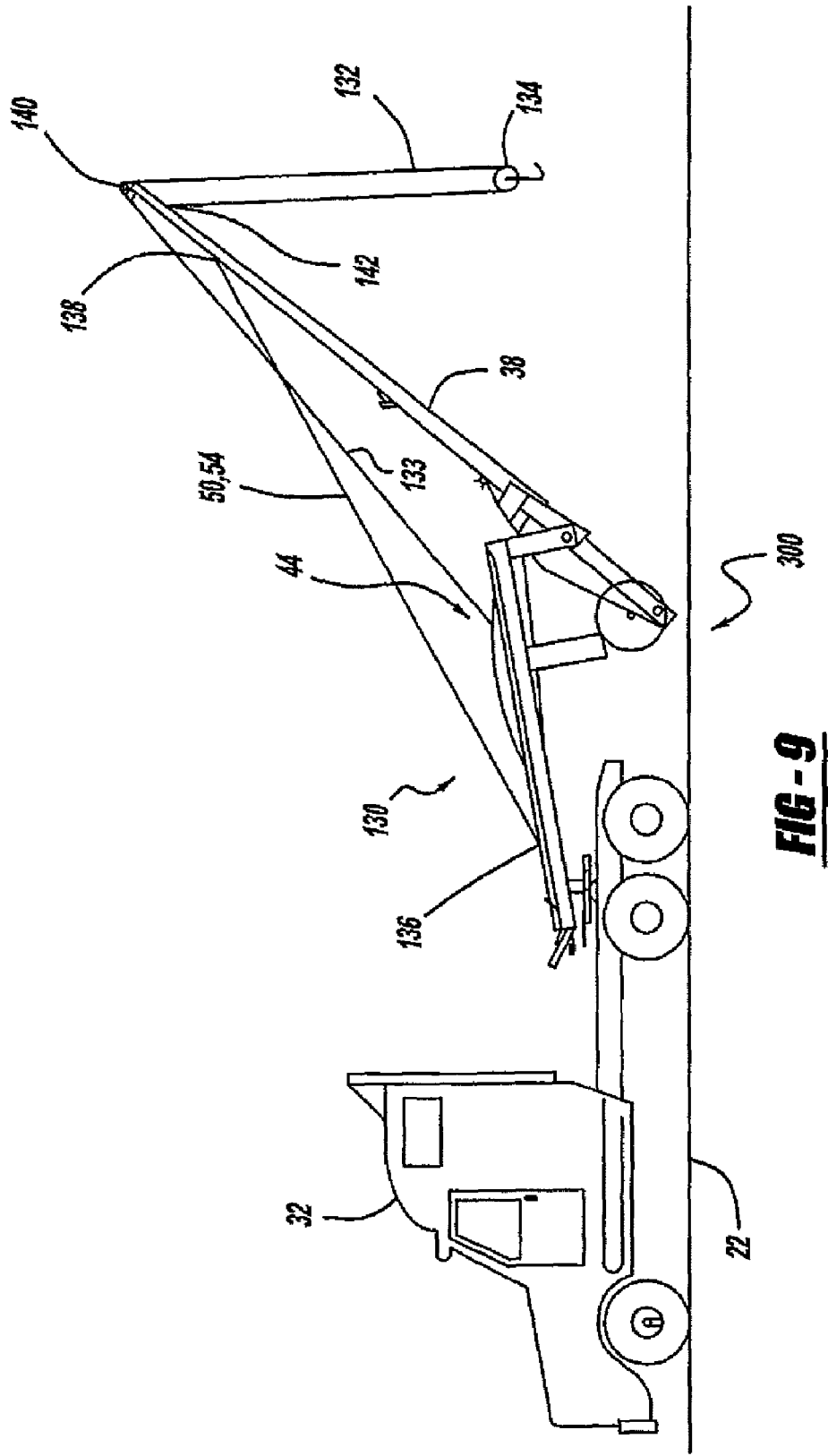
FIG. 9 illustrates a second preferred embodiment of the Universal Folding Boom performing a hoisting operation.

With reference to FIG. 9, the Universal Folding Boom Trailer 130 is there shown in a crane position 300 by fixedly attaching to truck 32, preferably at the fifth wheel connection 26. To form the crane position 300, the Universal Folding Boom Trailer 130 is equipped with additional cables 132, 133 for use in conjunction with a snatch block 134. Initially, the Universal Folding Boom Trailer 130 is preferably laid on the ground 22 in the unfolded position 200 (FIG. 2). Boom support cables 50, 54 are extended from a first end 136 of the Universal Folding Boom Trailer 130 to the forward end 138 of boom 38. The boom 38 is retracted toward the folded position 100 via winch 44. During retraction, the boom 38 is stopped at a point where cable 133 is detachable from winch 44 and may be strung over transfer pulley 140 for connection with cable 132. Cable 132 wraps around snatch block 134 for attachment to boom 38 at point 142. The Universal Folding Boom 30 is now able to perform any hoisting operation needed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A towing system, comprising:
    a towing vehicle having a saddle mount or fifth wheel;
    a towed vehicle having an axle and a frame;
    a trailer mounted to the towing vehicle and to the towed vehicle, the trailer including
        a front portion for interfacing with the saddle mount or fifth wheel, the front portion including a pair of first members spaced apart a first distance between the first members,
        a rear portion at a different elevation from the front portion for mounting to both the axle and the frame of the towed vehicle, and supporting the towed vehicle, the rear portion including a pair of second members spaced apart a second distance between the second members, wherein the second distance is different from the first distance, and the rear portion is adjustable and slides forward and aft for hauling various lengths of the towed vehicle, and
        a middle portion connecting the front portion and the rear portion,
    wherein the front portion is configured for mounting to the towing vehicle and the rear portion is configured for towing the towed vehicle in a forward-facing direction, the mounting configuration of the front portion allowing for rotation of the trailer with respect to the towing vehicle.

2. The towing system of claim 1, wherein the front portion is joined at a first angle to the middle portion and the middle portion is joined to the rear portion at a second angle.

3. The towing system of claim 1, wherein the rear portion further includes a boom connected to and partly disposed between the pair of spaced apart second members.

4. A trailer for a towing system, comprising:
    a front portion having a pair of spaced apart first members for interfacing with a saddle mount or a fifth wheel of a towing vehicle, the front portion including a pair of first members spaced apart a first distance between the first members; and
    a rear portion having a pair of spaced apart second members at a different elevation from the first portion for adjustably mounting to an axle and a frame of a towed vehicle and supporting the towed vehicle; and
    a middle portion connecting the front portion and the rear portion, the rear portion including the pair of second members spaced apart a second distance between the second members, wherein the second distance is different from the first distance, and the rear portion is adjustable and slides forward and aft for hauling various lengths of the towed vehicle, the rear portion rotatably joined to the middle portion with a pivot and further including a position lock for selectively making the rear portion rigid with the middle portion;
    wherein the front portion is configured for mounting to the towing vehicle and the rear portion is configured for towing the towed vehicle in a forward-facing direction, the mounting configuration of the front portion allowing for rotation of the trailer with respect to the towing vehicle, the rear portion adjustable and sliding forward and aft for hauling various lengths of the towed vehicle.

5. The trailer of claim 4, wherein the front portion is joined at a first angle to the middle portion and the middle portion is joined to the rear portion at a second angle.

6. The trailer of claim 4, wherein the rear portion further includes a boom connected to and partly disposed between the pair of spaced apart second members.

7. A method for preparing to tow a forward-facing towed vehicle with a towing vehicle, the method comprising the steps of:
providing a trailer for a towing system for interfacing with a saddle mount or a fifth wheel of a towing vehicle, a front portion including a pair of first members spaced apart a first distance between the first members, and a rear portion at a different elevation from the front portion for adjustably mounting to an axle and a frame of a towed vehicle and supporting the towed vehicle, the rear portion including a pair of second members spaced apart a second distance between the second members, wherein the second distance is different from the first distance, and the rear portion is adjustable and slides forward and aft for hauling various lengths of the towed vehicle, wherein the front portion is configured for mounting to the towing vehicle and the rear portion is configured for towing the towed vehicle in a forward-facing direction, the mounting configuration of the front portion allowing for rotation of the trailer with respect to the towing vehicle;
mounting the front portion to the towing vehicle;
adjusting a position of the rear portion to compensate for a length of the towed vehicle;
fixedly mounting the rear portion to the axle of the towed vehicle; and
fixedly mounting the rear portion to the frame of the towed truck.

8. The method of claim 7, wherein the front portion is joined at a first angle to a middle portion and the middle portion is joined to the rear portion at a second angle.

9. The method of claim 7, wherein the rear portion further includes a boom connected to and partly disposed between the pair of spaced apart second members.

* * * * *